Patented Aug. 31, 1943

2,328,158

UNITED STATES PATENT OFFICE 2,328,158

ART OF REFINING

Edward J. Martin, East Chicago, Ind., assignor to Sinclair Refining Company, New York, N. Y., a corporation of Maine No Drawing. Application May 13, 1940, Serial No. 334,906

6 Claims. (Cl. 252—276)

This invention relates to refining of mineral oil and more particularly to a step in the process of decolorizing mineral oil. In the treatment of mineral oil with decolorizing earths to remove objectionable coloring matter from the oil, the objectionable coloring matter removed from the oil is adsorbed by the decolorizing earth. As a matter of economy of operation the decolorizing earth may then be reactivated by treatment to remove the coloring matter. Various color solvents have been employed for this purpose. Ketones, such as methyl ethyl ketone, have been used.

In the usual process of treating mineral oils containing objectionable coloring matter the oil, due to its viscous character, may first be blended with a suitable solvent. Any of the known solvents may be employed. It is preferable to employ a solvent that is sufficiently volatile to be separated from the oil by distillation at relatively low temperatures and that may be also separated, or partially separated from the color solvent by distillation. Naphtha, having an initial boiling point of 250° F. and an end point of 350° F. is particularly useful for this purpose. The mixture of oil and solvent is first brought into contact with the decolorizing earth preferably at an elevated temperature between 150° F. and 600° F. and the coloring matter extracted from the oil by the decolorizing earth. Many decolorizing earths may be employed for this purpose. As examples of decolorizing earths now used, I may mention finely divided fuller's earth, activated bauxites, such as "Porocel," and acid treated bentonites, such as "Filtrol" cr "Tonsil." In carrying out the present invention I have employed the synthetic adsorbent decolorizing earth known as "Magnesol" which is a hydrated magnesium silicate. It is understood that the term "decolorizing earth" as used in the description and claims of the present invention refers to any of the naturally occurring or artificially prepared decolorizing materials known to the art and used in bleaching mineral oils. The oil is brought into contact with the decolorizing earth such as Magnesol, employing from 6 to 12 percent of the decolorizing earth on a dry basis by weight of oil. In various tests which I have performed, I have employed from 7.2 to 10.7 parts by weight of Magnesol depending upon the amount of coloring matter to be removed from the oil.

After the oil has been treated with the decolorizing earth it is the usual practice to separate the oil and the earth. The retained coloring matter may be extracted from the earth by treatment with an appropriate color solvent, followed by a washing with naphtha to remove the color solvent from the decolorizing earth. The naphtha is then stripped from the decolorizing earth and the decolorizing earth is ready for reuse.

As stated, various color solvents have heretofore been proposed for use in reactivating decolorizing earth employed in the process of bleaching or decolorizing oil. Some of these solvents are more effective than others in reactivating or restoring the clay. The efficiency of the solvent is determined and expressed in terms of average efficiency over 10 cycles of operation as compared to new clay. Dry methyl ethyl ketone, when used in blend with naphtha, revivifies decolorizing earth which has been used at a temperature of 400° F. to an average efficiency of 60–65 percent over 10 cycles of operation. Acetone and mixtures of ethyl alcohol or acetone and methyl ethyl ketone have also been used as a color solvent in the treatment of decolorizing earths.

These color solvents may be blended with naphtha using three parts of naphtha to one part of color solvent. While they are generally used dry, it has been proposed to use ketones containing enough water to render the color solvent immiscible with naphtha or the lubricating oil being treated. The use of water in such quantities, which is in the neighborhood of 40 percent, is objectionable because it causes foaming and produces emulsion troubles in the mixing of decolorizing earth, oil and immiscible solvents containing water in such quantities.

I have found that the efficiency of ketones, or mixtures thereof with alcohols, as color solvents in the revivification of spent decolorizing earths may be materially increased by adding a limited amount of water to the blend of color solvent and naphtha. The quantity of water used should not exceed that which will be miscible in a three to one blend of naphtha and the color solvent. In practice about 5 to 6 percent of water may be employed. The addition of 5 percent of water to methyl ethyl ketone used with naphtha in a three to one proportion for the revivification of Magnesol results in increasing the average efficiency of the decolorizing earth to 75 to 80 percent.

In practicing the process, the lubricating oil to be treated is first preferably mixed with naphtha or other suitable solvent to reduce it to a viscosity at which it may be more easily handled and it is then brought into contact with a decolorizing earth, such as Magnesol at an elevated temperature, for example 400° F., for a sufficient period of time to remove the coloring matter from the oil. The decolorizing earth, such as Magnesol, may be used in an amount equal to from .6 to 12 percent of the weight of the oil and in carrying out specific tests I have employed 7.2 percent Magnesol. After the oil has been thus treated and separated from the decolorizing earth, the wet cake of decolorizing earth from the filter is then washed with naphtha to remove substantially all the remaining oil from it. This washing may be performed at a temperature of 130° F. employing from .8 gal. to 1 gal. of naphtha per pound of dry clay. The naphtha used in the treatment is recovered and reused in the process.

The deoiled filter cake of decolorizing earth is then treated with the color solvent forming the subject matter of the present invention for the purpose of removing the coloring matter therefrom and reactivating it for further use in the process. This is done by forming a slurry of the deoiled cake and a blend of naphtha and color solvent containing a quantity of water that is miscible in a three to one mixture of naphtha and the color solvent. As stated, I may employ methyl ethyl ketone, acetone, or mixtures of these materials or any of the other ketones heretofore employed as color solvents in the revivification of spent decolorizing earth. The color solvent containing substantially 5 percent of water is mixed with naphtha in the proportion of one part of color solvent to three parts of naphtha. The spent decolorizing earth is treated with this blend in the proportion of substantially one gallon of the blend to one pound of clay. The treatment is carried out in any convenient manner as heretofore practiced in the art. The contaminating coloring matter may be extracted from the decolorizing earth in a filter and after sufficient treatment to extract the contaminating coloring matter from the decolorizing agent, the color solvent blend may be separated from the earth by washing with naphtha. It may then be subjected to fractionation to separate the color solvent from the naphtha or may be otherwise treated to recover the naphtha and color solvent. In the tests which I have performed I have found that ketones, or mixtures of alcohols and ketones, blended with naphtha in the proportion of one part of color solvent to three parts of naphtha and in which the color solvent contains a quantity of water which is miscible in such blend, results in a material increase in the efficiency of the color solvent in reactivating spent decolorizing earths. In treating raffinate stock to remove objectionable coloring matter therefrom I have found that methyl ethyl ketone containing substantially 5 percent of water will revivify Magnesol to an average efficiency of 75 to 80 percent compared to new clay.

In a specific example of the process nitro benzene plus sulfuric acid treated raffinate stock is first blended with naphtha, preferably a naphtha that has been previously used in deoiling the decolorizing earth and this blend is treated with Magnesol using substantially 7.2 percent of the decolorizing earth on a dry basis. The solvent and decolorizing earth are maintained in contact with each other at a temperature of substantially 400° F. for sufficient period of time to remove the contaminated coloring matter from the oil. The naphtha is separated from the mixture of oil and clay by distillation and the oil is then separated from the decolorizing earth in a suitable filter, preferably of the enclosed type, and comprising one or a plurality of conventional batch or rotary drum type vacuum or pressure filters. The blend of oil and naphtha from which the contaminated coloring matter has been removed is then treated by distillation or otherwise to separate the naphtha from the oil.

The filter cake is then submitted to a deoiling operation to remove the last traces of oil from it. In carrying out this step the wet filter cake is slurried with naphtha, preferably employing the final naphtha wash from a previous deoiling operation. It is then filtered and washed at a temperature of 130° F. using substantially .8 gal. of naphtha per pound of dry clay. The filtrate of the deoiling operation is separated into two cuts, the first 75 percent being employed to prepare additional blend with fresh raffinate for contact with the decolorizing earth and the second cut of .25 percent being employed to slurry the filter contact cake in the deoiling operation.

The deoiled filter cake is then ready for reactivation, or treatment to remove the adsorbed coloring matter therefrom. A slurry is formed with final naphtha wash from a previous reactivation, and color solvent. As stated, the color solvents which I employ are ketones or mixtures thereof, such as methyl ethyl ketone, acetone, or mixtures of methyl ethyl ketone and ethyl alcohol. The color solvent is mixed with naphtha in substantially the proportions of one part of color solvent to three parts of naphtha. The color solvent contains 5 to 6 percent of water and the deoiled slurry cake is treated with this blend in a proportion of substantially 1 gal. to a pound of clay. The clay is then separated from the blend of color solvent and naphtha in a filter and the blend treated to separate the color solvent from the naphtha. The filter cake is then washed at a temperature of 130° F., employing substantially .8 gal. of naphtha per pound of clay. The filtrate from this treatment is also taken in two cuts, the first cut being added to the spent color solvent solution for the preparation of fresh color solvent solution and consisting of 75 to 80 percent of the amount of naphtha employed. The remaining 20 to 25 percent, forming the second cut, is employed to slurry the deoiled filter cake for the reactivation step. Upon the completion of this step, the reactivated cake is then ready for use with fresh raffinate naphtha blend for removal of contaminating coloring matter from the oil.

I claim:

1. In the revivification of substantially water free decolorizing earth used in the bleaching or decolorizing of mineral oil and containing extracted coloring matter, the step which comprises treating the decolorizing earth with a blend of substantially 3 parts of naphtha, 1 part of a ketone, and an amount of water comprising not less than 5 percent and not more than is miscible with the blend at the temperature employed in treating the decolorizing earth, and maintaining the water content of the blend at not less than 5 percent and not more than is miscible with the blend at the temperature employed in treating the decolorizing earth.

2. In the revivification of substantially water free decolorizing earth used in the bleaching or decolorizing of mineral oil and containing extracted coloring matter, the step which comprises treating the decolorizing earth with a blend of substantially 3 parts of naphtha, 1 part of methyl ethyl ketone, and an amount of water comprising not less than 5 percent and not more than is miscible with the blend at the temperature employed in treating the decolorizing earth, and maintaining the water content of the blend at not less than 5 percent and not more than is miscible with the blend at the temperature employed in treating the decolorizing earth.

3. In the revivification of substantially water free decolorizing earth used in the bleaching or decolorizing of mineral oil and containing extracted coloring matter, the step which comprises treating the decolorizing earth with a blend of substantially 3 parts of naphtha, 1 part of acetone and an amount of water comprising not less than 5 percent and not more than is miscible with the blend at the temperature employed in treating the decolorizing earth, and maintaining the water content of the blend at not less than 5 percent and not more than is miscible with the blend at the temperature employed in treating the decolorizing earth.

4. In the revivification of substantially water free decolorizing earth used in the bleaching or decolorizing of mineral oil and containing extracted coloring matter, the step which comprises treating the decolorizing earth with a blend of substantially 3 parts of naphtha, 1 part of a ketone, and from 5 to 6 percent of water, and maintaining the water content of the blend between 5 and 6 percent.

5. In the revivification of substantially water free decolorizing earth used in the bleaching or decolorizing of mineral oil and containing extracted coloring matter, the step which comprises treating the decolorizing earth with a blend of substantially 3 parts of naphtha, 1 part of methyl ethyl ketone, and from 5 to 6 percent of water, and maintaining the water content of the blend between 5 and 6 percent.

6. In the revivification of substantially water free decolorizing earth used in the bleaching or decolorizing of mineral oil and containing extracted coloring matter, the step which comprises treating the decolorizing earth with a blend of substantially 3 parts of naphtha, 1 part acetone, and from 5 to 6 percent of water, and maintaining the water content of the blend between 5 and 6 percent.

EDWARD J. MARTIN.